(12) United States Patent
Steinich

(10) Patent No.: US 7,965,073 B2
(45) Date of Patent: Jun. 21, 2011

(54) DISTANCE MEASURING DEVICE

(75) Inventor: Klaus Manfred Steinich, Zorneding (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 984 days.

(21) Appl. No.: 11/793,645

(22) PCT Filed: Dec. 28, 2005

(86) PCT No.: PCT/EP2005/014099
§ 371 (c)(1),
(2), (4) Date: Aug. 10, 2007

(87) PCT Pub. No.: WO2006/069786
PCT Pub. Date: Jul. 6, 2006

(65) Prior Publication Data
US 2008/0150520 A1    Jun. 26, 2008

(30) Foreign Application Priority Data

Dec. 28, 2004 (DE) .......................... 10 2004 062 968

(51) Int. Cl.
*G01B 7/14* (2006.01)
*G01R 33/38* (2006.01)
(52) U.S. Cl. .......... 324/207.21; 324/207.13; 324/207.24
(58) Field of Classification Search ............. 324/207.21, 324/207.13, 207.24
See application file for complete search history.

(56) References Cited

U.S. PATENT DOCUMENTS

| 5,313,160 A | 5/1994 | Gloden et al. |
| 2002/0135359 A1 | 9/2002 | Steinich |

FOREIGN PATENT DOCUMENTS

| DE | 101 08 925 A1 | 2/2001 |
| DE | 102 01 880 A1 | 1/2002 |
| DE | 10 2004 018 818 A1 | 4/2004 |
| DE | 20 2004 006 144 U1 | 8/2004 |
| WO | WO2005/100927 A1 | 10/2005 |

*Primary Examiner* — Reena Aurora
(74) *Attorney, Agent, or Firm* — Head, Johnson & Kachigian, P.C.

(57) ABSTRACT

The invention relates to a distance measuring device, in particular to a magnetostrictive distance measuring device, which can be manufactured in a simple and cost efficient manner and still satisfy strict requirements with respect to tightness, with an elongated housing, shaped as a stable, hollow, circumferentially closed particularly one piece profile, with a constant cross section contour in longitudinal direction, a wave conductor unit in the interior of the profile, wherein the wave conductor of the wave conductor unit extends in longitudinal direction of the profile, processing electronics, a slide movable in longitudinal direction on the outside along the profile, in particular with a magnet as signal generator, wherein the profile has an inner contour without shoulder over its entire length, and in the inner contour at least one insert with an inner contour is disposed torque proof, which also has inner corners, outer corners, and/or shoulders.

53 Claims, 11 Drawing Sheets

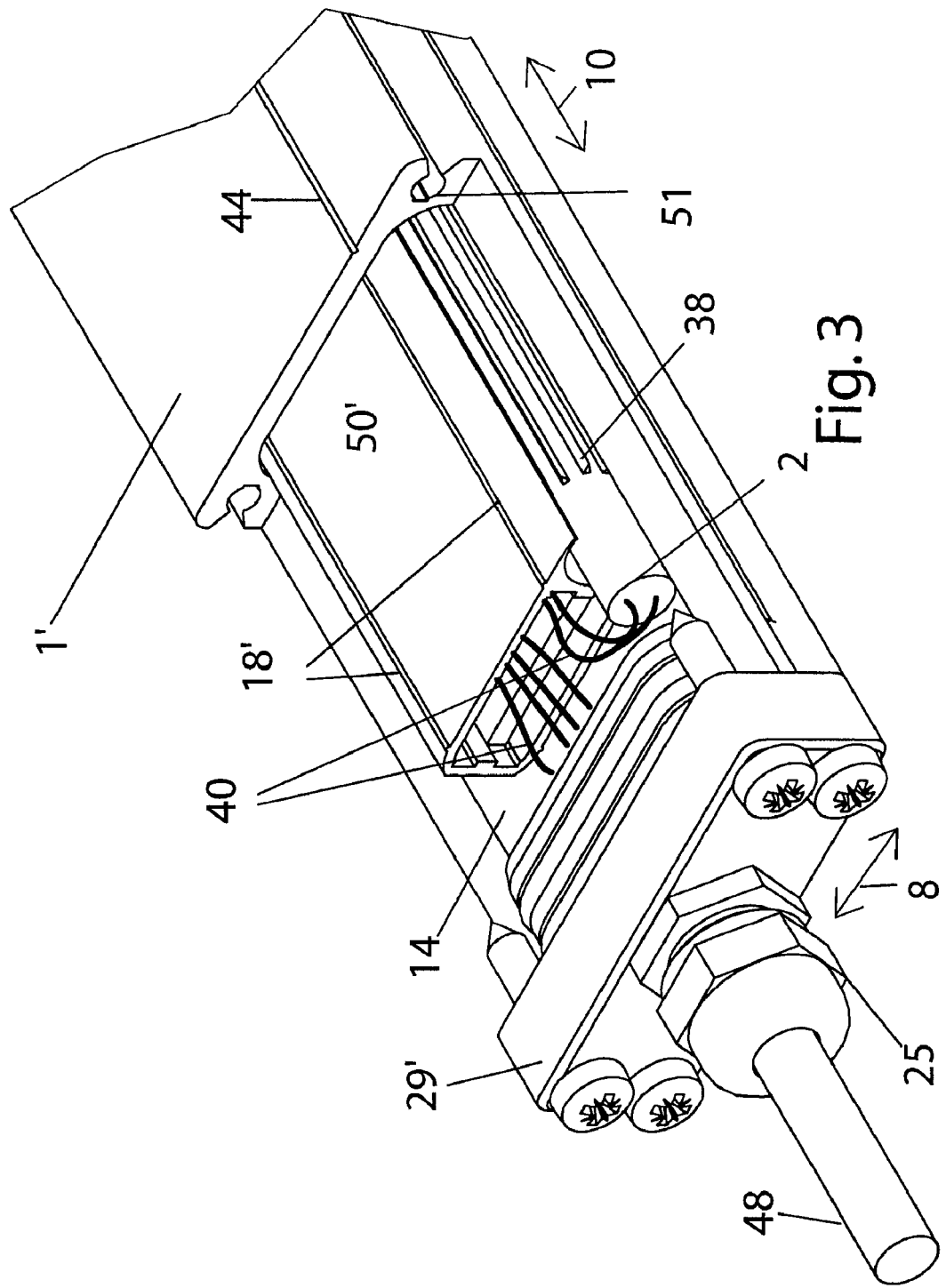

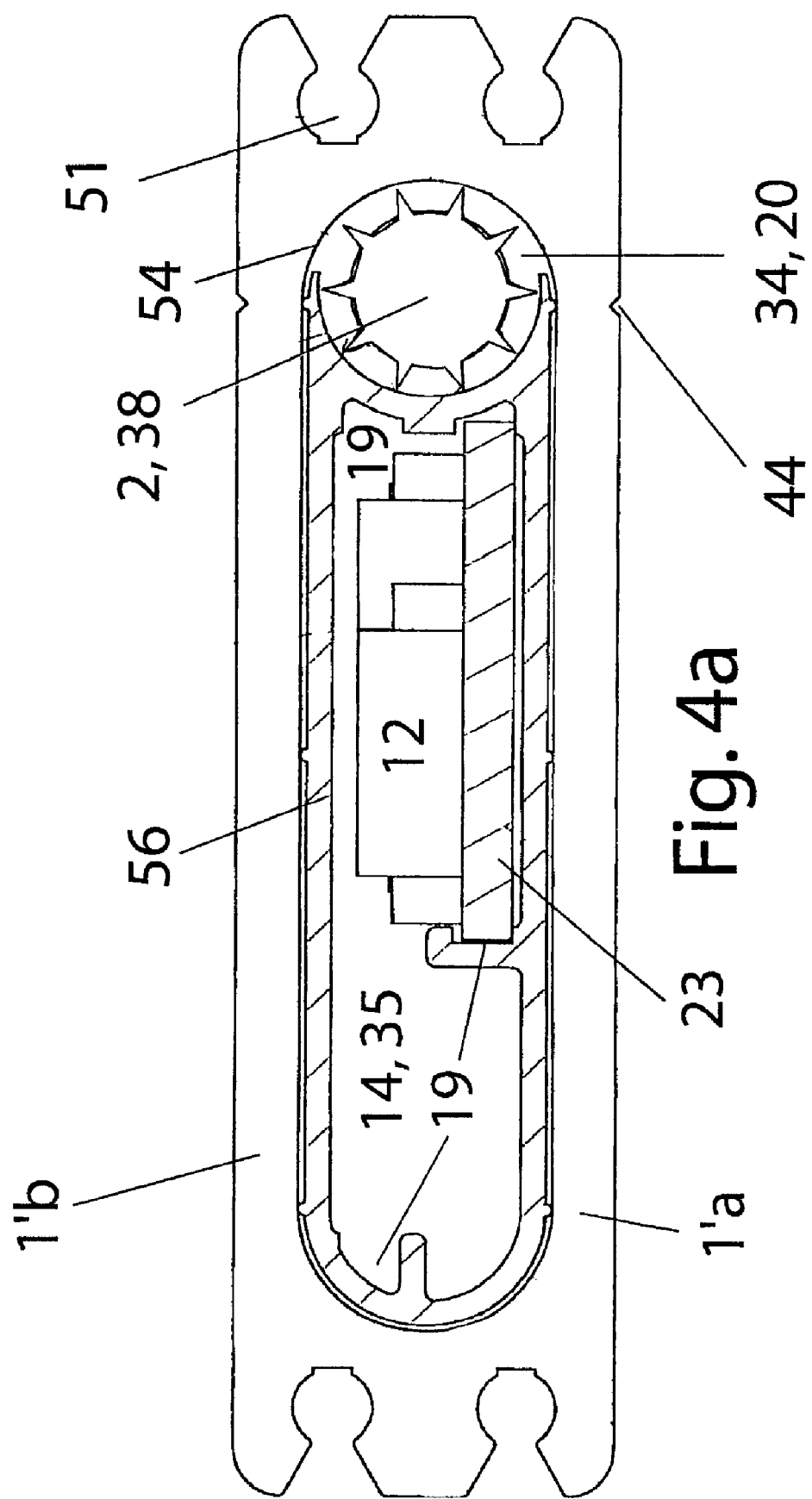

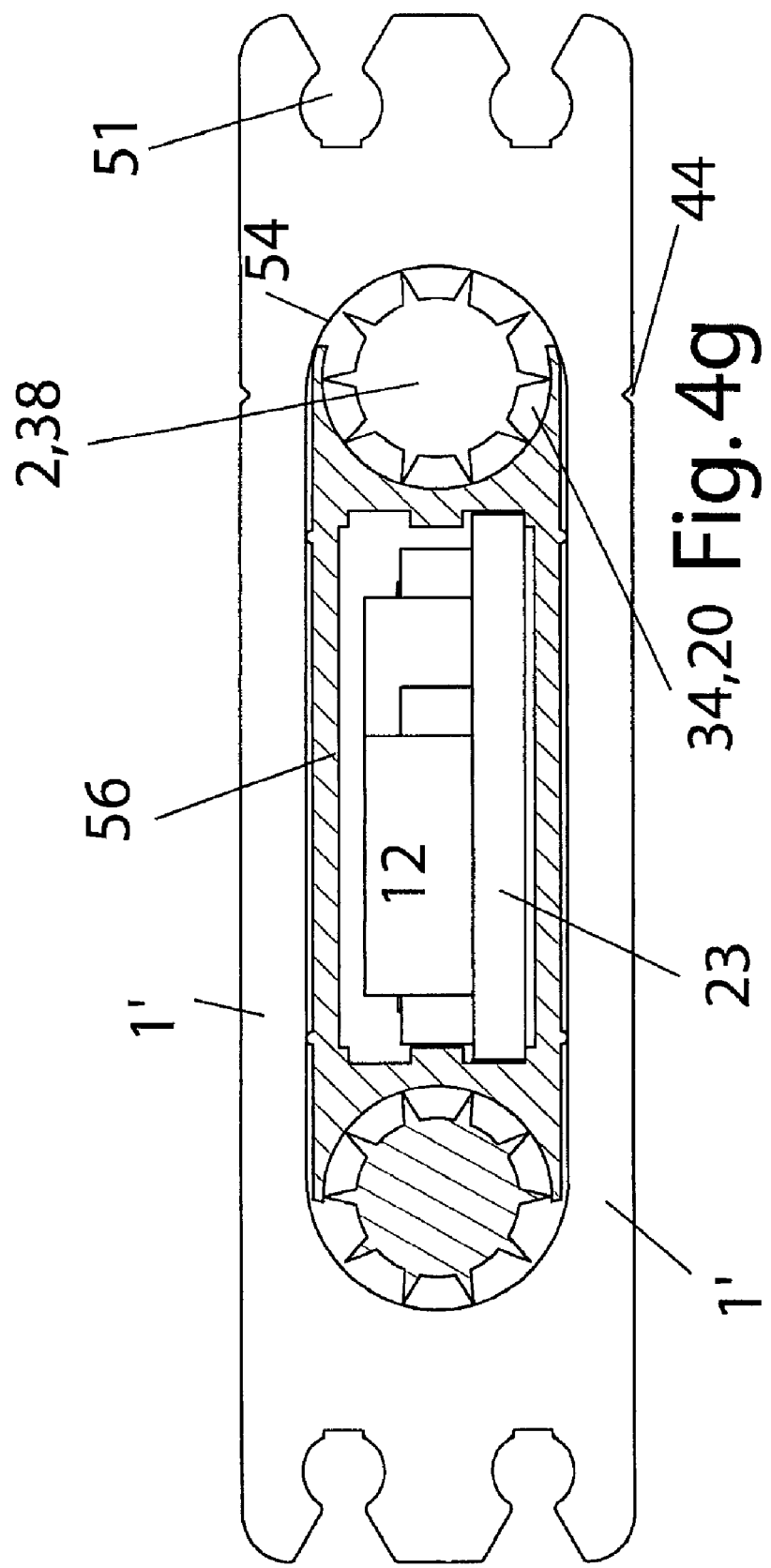

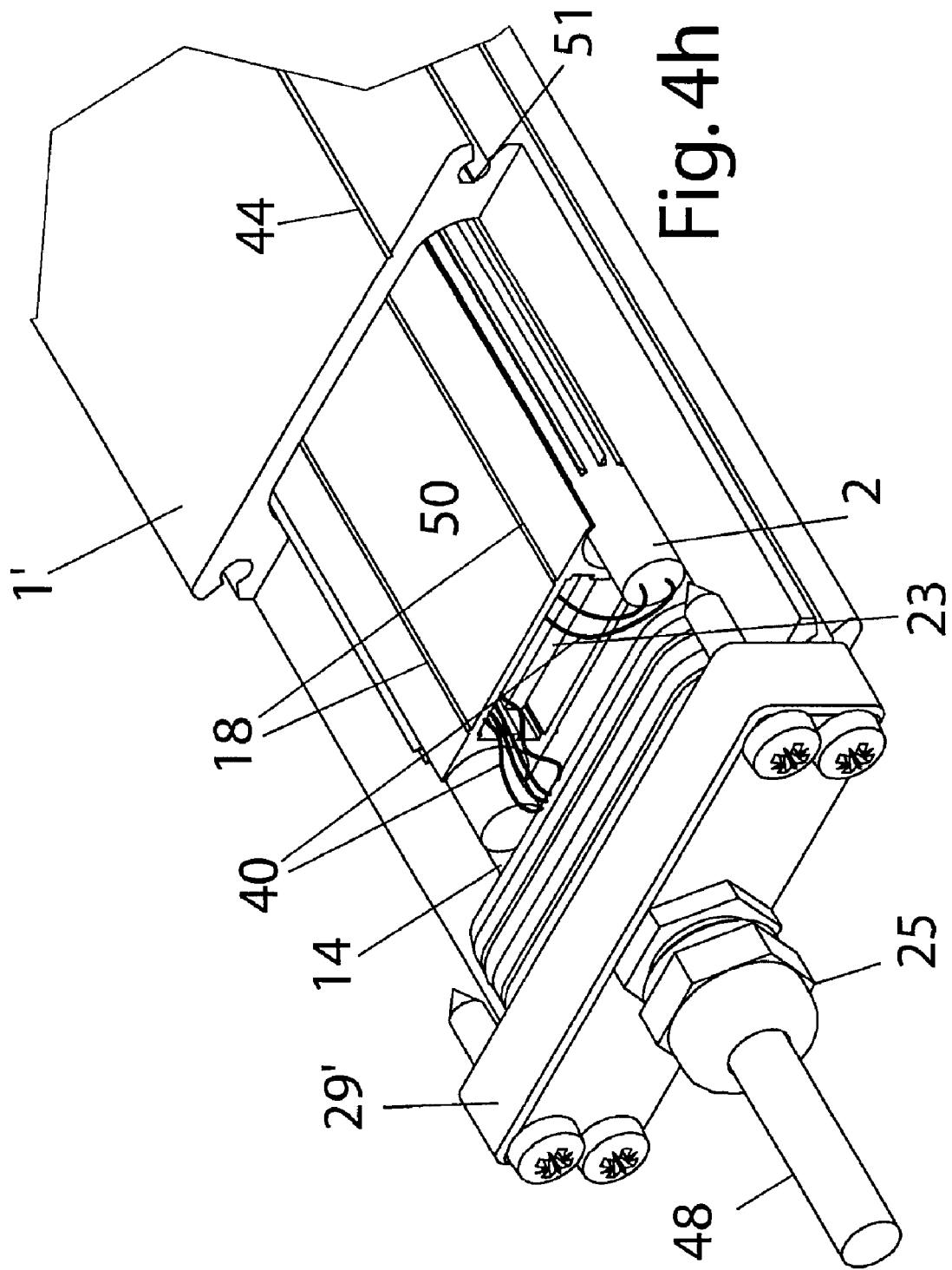

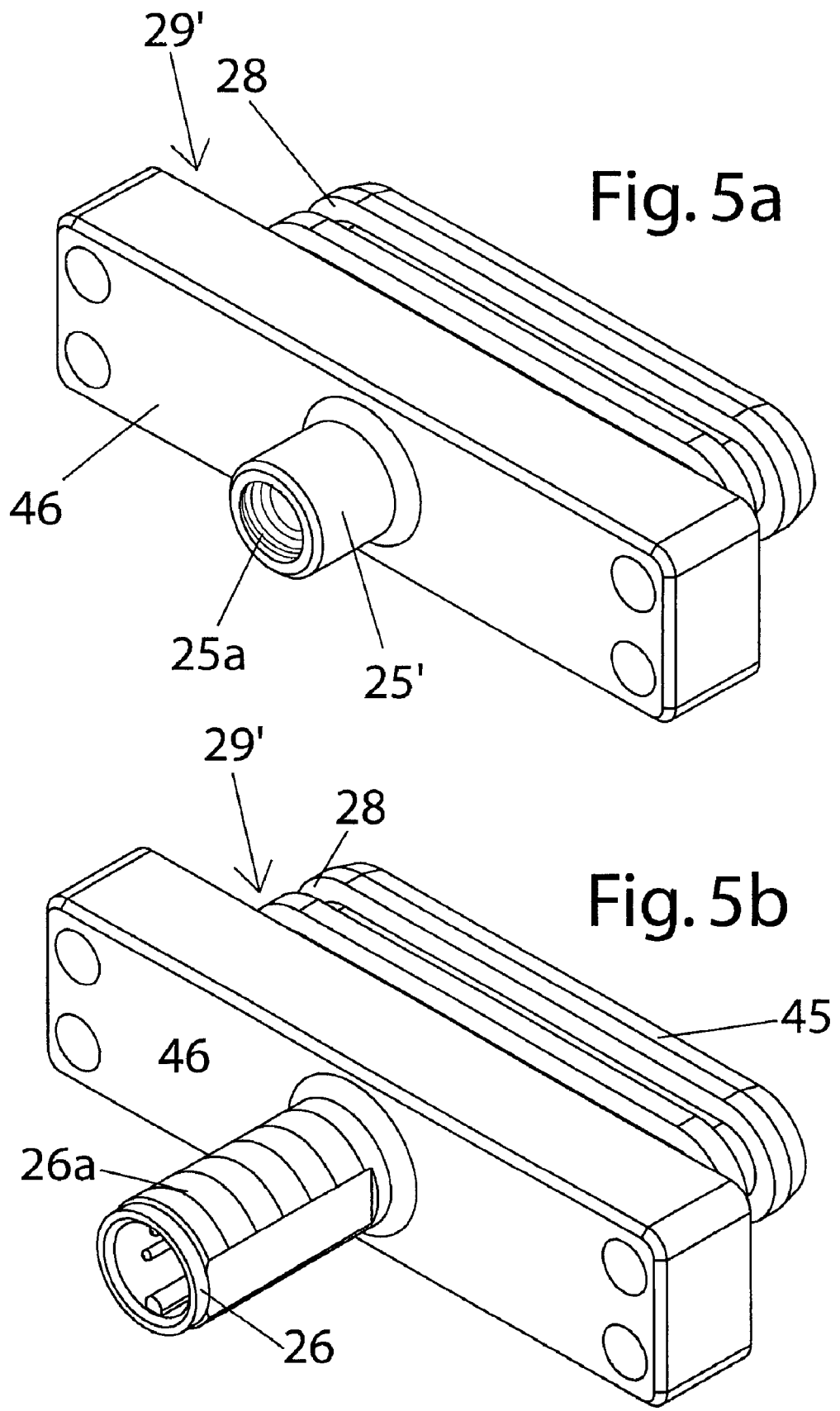

DISTANCE MEASURING DEVICE

CROSS REFERENCE TO RELATED APPLICATIONS

This application is the United States National Phase of PCT Application No. PCT/EP/2005/014099 filed 28 Dec. 2005 which claims priority to German Patent Application No. 102004062968.24-42 filed 28 Dec. 2004.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to a distance measuring device, in particular, to a magnetostrictive distance measuring device.

2. Background Art

The basic principle is that a distance measuring element extends in longitudinal direction of the device along the distance to be measured and a signal generating position generator is moveable in longitudinal direction relative to it.

In a magnetostrictive distance measuring device, the basic principle of such a device is refined in so far, as a wave conductor made from an electrically conductive and also magnetizable material extends in measuring direction, the longitudinal direction of the device, in particular, in a slightly taunt state.

A magnet is connected with the component, whose position in longitudinal direction is to be measured, or monitored, and is being moved by this component in longitudinal direction of the wave conductor without contacting, but at a sufficiently small distance.

An electrical impulse induced into the wave conductor causes a mechanical wave as an interaction with the magnet, which propagated along the wave conductor from the position of the magnet, and which is detected with respect to its runtime by the processing electronics, which are mostly located at the end of the wave conductor, from which the longitudinal position of the magnet, and thus of the component to be monitored, is known relative to the wave conductor.

Since such distance measuring devices often have to be used in machinery, also in production machinery, they have to comply with numerous requirements, like e.g. protection of the measuring device against mechanical damages and contamination, in particular, against penetration of moisture into the processing electronics, maintaining the original tension of the wave conductor, shielding electromagnetic radiation of the processing electronics towards the outside and the inside, ease of assembly, and maintenance of the measuring device.

One the one hand, it is already known in this respect to receive the wave conductor in a supporting, but not overly dampening enclosure, and to use it as a wave conductor unit in this form.

On the other hand, it is already known to locate the wave conductor or the wave conductor unit in a protected manner in an interior of a circumferentially closed hollow tubular profile, which can be manufactured as an extruded profile in a cost effective manner.

Thus, the tubular profiles have to comply with different requirements depending on the intended use:

high stiffness against bending in lateral direction;
small space requirement, especially as a very flat tubular profile;
symmetrical shape of the interior cavity of the tube for variable use;
specific mounting method of the tubular profile relative to its environment;
rotatability of the tubular cross section, in particular, also in already assembled state, relative to the component carrying the profile;
particularly cost effective manufacture; and
possibility to place in an additional protective second housing.

For this purpose, the outer contour, as well as the inner contour, of the profile had a defined shape. The inner contour was designed for receiving the wave conductor units, as well as the single or plural circuit boards, carrying the processing electronics. The conductor designs, in particular of the inner contour, had to allow for different technical outfitting. For high sealing requirements, where the flat placement of a cover with a flat gasket onto the front face of the profile was not sufficient, the front end areas of the profile had to be milled into a contour without a shoulder, into which a cover with an accordingly shaped protrusion, whose outer circumference had an annual groove for receiving an O-ring, could be inserted, what allowed for much improved sealing.

Without a shoulder in this context means that the respective interior contour has no concave or convex protrusions or indentations, whose curvature radius is so small that a sealing O-ring moved over it, is permanently damaged and loses its sealing capability.

This milling, however, was time consuming and difficult because of the 5 meter long profiles, in whose end areas these millings had to be performed.

BRIEF SUMMARY OF THE INVENTION

Therefore, it is an object of the present invention to provide a distance measuring device which is simple and cost effective to manufacture while still fulfilling strict requirements with respect to leak tightness.

Through an inner contour of the profile without a shoulder over its entire length, an insert, required for the mechanical fixation of the components to be housed in the interior of the profile, is disposed at least torque proof in the inner contour of the metal profile without a shoulder, which can e.g. also be made of plastic, and wherein the inner contour of the insert can have grooves, in particular, undercut grooves, inner edges, outer edges, and shoulders.

Without a shoulder means in this context, that the inner contour of the profile can be sealed by a circumferential seal, acting radially from the inside to the outside against this inner contour, e.g. an O-ring inserted into an outer circumferential groove of a respective protrusion of an end cover reaching into the interior of the profile. This means that the inner contour of the profile can certainly have inflections and curves, concave and convex, which however cannot have a curvature radius in the cross section plane of the profile that is so small that the sealing abutment of an O-ring at the profile and at the inward protruding component, which carries the O-ring, is prevented, or through the strong curvature, its premature fatigue and damaging and, thereby non tightness, has to be a concern.

For manufacturing the distance measuring device, the insert, having the designed interior contour, is provided shorter than the surrounding metal profile, and inserted in from or together with the wave conductor unit and/or the printed circuit boards of the processing control unit, axially and in the right rotation position, into the interior of the profile, or in a profile, made from two clam shells, inserted in between, and fixed in rotation position and, preferably also in longitudinal direction at this position, either due to an oversize, a radially outward directed inner tension or simply through gluing. The axial positioning is thereby performed so that in the axial end areas end cavities remain in the interior profile without shoulder, which are not occupied by the insert, and which have such an axial length, so that the respectively designed protrusions of the end covers can be inserted, in whose outer circumference the one or several sealing O-rings are disposed in an outer circumferential groove in the protrusion, and which are sized in their cross section, so that the O-ring then contacts the interior circumference of the inner profile without a shoulder in a sealing manner.

For this purpose, the end covers are preferably mounted to the profile so they are detachable, e.g. through threaded connections, reaching through the cover into the profile, which can e.g. be bolted into the corner grooves of the outer contour of the profile with self threading bolts.

This way the profile is not damaged for the connection between cover and profile, so that the profile does not have to be exchanged subsequently, also when opening the distance measuring device.

The inset, normally made from plastic, has an outer contour which fits into the inner contour of the profile in a form locking manner.

For this purpose, the outer contour of the insert can be adapted to the inner contour of the profile, in particular, over more than 180°, or it can also only have a largest diameter, which corresponds to the largest diameter of the inner contour of the profile, which is, however, spaced from the inner contour of the profile in the direction of the smaller diameter.

The latter also allows providing an universal insert with an elongated cross section, which can be inserted into various inner contours of different profile, e.g. a profile approximately square on the outside with a circular inner contour, as well as, a profile that is flat on the outside with an elongated inner contour.

Preferably, the cross section of the insert is thus provided elastic so that it can always adapt in a sufficiently precise manner with its outer circumference to the inner circumference of the profile, in spite of unavoidable manufacturing tolerance.

This is possible with a circumferentially closed cross section of the insert, in which it has e.g. indentations towards the inside, which are elastic, in particular, provided as one or several cavities of the wave conductor.

In particular, two opposing wave conductor cavities, which are open to the outside, have the advantage that the wave conductor unit inserted into the wave conductor cavities is elastic in lateral direction thereby holding the insert through friction locking relative to the interior contour of the profile when the sum of wave conductor unit and insert is oversized relative to the inner contour of the profile in lateral direction. Preferably, one wave conductor unit each is thus inserted in both wave conductor cavities for reasons of the elastic compression in radial direction, of which only one wave conductor unit has to be a functional wave conductor unit; the other one can only be made from the elastic encasement of a typical wave conductor unit, which is elastic in transversal direction.

For elastic contact at the profile, the insert can also have a circumferentially open profile.

When, for example, only one wave conductor is received in the insert, a receiving groove is sufficient, which is provided in the central area of the insert, preferably covering more than 180°, or even a circumferentially closed receiving groove for it, from which radially elastic struts can protrude sideward, like ribs from a sternum, which can also be adapted to the inner contour over more than 180°, without a circumferentially closed profile having to be provided as an insert, which is certainly the most stable variant that can be positioned best, but which also has the highest material requirement.

In a similar manner, the insert can have different cross section designs in different longitudinal sections, which can be manufactured through extrusion in a cost effective manner, instead of a constant overall cross section of the insert, which is constant over the entire longitudinal extension of the profile, besides the end cavity.

Thus, the rib shaped appendices, which cause the radially outward directed clamping in the interior profile without shoulder, can only be provided in larger longitudinal distances. In a similar manner, not only one, but several of them can be provided offset in longitudinal direction, whose distances are sized so that the intrinsic stability, e.g. of the wave conductor unit, is sufficient in between for the function of the entire distance measuring device.

An insertion into the profile is then possible through the single inserts, which are offset from each other in longitudinal direction, are previously mounted on the wave conductor unit at the correct distances in a longitudinally fixated, and preferably, also torque proof manner, and then inserted into the profile together with it.

The inner contour without shoulder preferably is a contour with sections made from partial circles, in particular, an oval contour or a slotted hole contour, ideally a circular contour.

Through the specific design of the outer contour of the profile, so that in an inner contour, partially covering the profile, but by more than 180°, a defined ability for positioning in transversal direction and also a rotatability of the profile is given, in spite of the fixation through common holding bands, clamps, supports, or similar holding devices, a fixation and at least after the coarse fixation, a rotation of the profile around the longitudinal axis can still be performed on the device as fine positioning, which greatly simplifies the assembly process.

In order to know, close to which spot of the circumference of the profile the wave conductor is positioned in the interior, a mark is therefore provided, either on the profile, or on the closing end cover.

In order to have mounting means at the outer circumference, preferably several outer grooves, which are open to the outside, are provided along the outer circumference, particularly distributed along the circumference in a symmetric manner. Preferably, these outer grooves are provided as so-called combination grooves, whose cross section is suited, on the one hand, for threading in the bolts in longitudinal direction, and, on the other hand, for inserting plate shaped elements, thus tension lugs, or the protrusions of the slide to be guided on the outside of the profile in transversal direction.

For this purpose, the combination grooves are preferably provided shaped as vases, having a circular segment shaped cross section in the deeper positioned area of the groove, where the groove also preferably has a flat bottom, and where a neck expands in V-shape, and to the outside from this deeper located area, so that the tightest spot of the combination groove is the transition between the neck and the lower area.

Thus preferably four outer grooves, in particular combination grooves, are provided distributed over the circumference of the profile, and thus preferably, symmetrical to the longitudinal central plane, and additionally also to the perpendicular transversal center plane.

The inner contour of the insert is determined through the requirement that at least a wave conductor cavity and at least a pair of circuit board grooves have to be present there, preferably two of each, in order to allow a redundant design of the distance measuring device, thus with two wave conductor units and two respective associated circuit boards with processing electronics located thereon.

Thus, the wave conductor cavity is an undercut groove, preferably provided with an interior circumference, shaped as a circular arc, whose interior diameter is selected, so that the wave conductor unit, which is normally cylindrical, can be inserted in a longitudinal direction in a form locking manner, and cannot slide out in lateral direction. The wave conductor cavity is thus open to the interior cavity of the profile, like the printed circuit board grooves, which are located opposite to each other as pairs, between which the circuit boards can be inserted with their longitudinal side rims.

The position fixation in longitudinal direction is thus performed on the printed circuit boards through friction locking through one or two elastic, extended threads, which are inserted along the longitudinal edges of the circuit board in the base of the groove, like e.g. rubber or silicon, or a respective hose, which is released at the desired location after longitudinal positioning, and through the subsequent lateral expansion of the elastic hose or elastic thread, the printed circuit board is wedged between the printed circuit board grooves.

The wave conductor unit, on the other hand, has a friction coefficient, which is large enough by itself, relative to the interior circumference of the wave conductor cavity, in order not to move by itself anymore after insertion in longitudinal direction, since it preferably also comprises a slippage inhibiting elastic hose, e.g. from silicon, also at its outer circumference, which can also be stretched for inserting the wave conductor unit.

The circuit board grooves are thus either provided, so that the circuit boards to be inserted respectively in parallel to each other, are located, transversal to the longitudinal center plane, which is defined by the middle of the profile and the middle of the at least one wave conductor cavity, and through the connection line between two wave conductor cavities.

The other possibility is to position the printed circuit board grooves, so that the respective circuit boards, inserted therein are located parallel to the longitudinal central plane, certainly laterally offset relative to the wave conductor cavities.

Preferably also the circuit board grooves are provided as undercut grooves, in particular as combination grooves.

Depending on the primary goal, the profile itself can have a wall thickness as constant as possible on all sides of the circumference, thus with a thickness deviation of +/−30% at the most, in particular +/−20% at the most, or, to the contrary, accumulate a maximum amount of material, besides the necessary cavities in the interior, thus for housing the printed circuit boards and the components located thereon, and the wave conductor units, so that the wall thickness measured in radial direction at the thickest location amounts to at least 3 times, better 5 times, the wall thickness at the thinnest location.

Preferably, the inner contour has two, in particular opposing, wave conductor cavities and two, better three, pairs of printed circuit board grooves, in particular also for the disposition of printed circuit boards with different widths.

The inner contour is thus symmetrical, preferably to the longitudinal center plane, in particular and/or to the transversal center plane.

On the face side, the profile is closed through end covers, wherein from at least one of the end covers, preferably with a redundant design, possibly even from both end covers, electrical cables are run out, in order to transmit the signals to a processing unit.

The end cover is preferably located on the front face of the profile, and is bolted onto it, with a gasket in between, by bolting it through respectively disposed bolt holes of the end cover a threaded connection into the outer grooves of the profile is performed via customary self cutting screws, e.g. sheet metal screws, or self tapping bolts, whereby the gasket leads around without interruption, e.g. within the bolt pattern. An O-ring seal can be provided in an outer circumferential groove of the adapted protrusion of the cover, which reaches into the profile, and then seals relative to the inner circumferential contour of the profile, while a cover plate, which is connected with the protrusion, in particular in one piece, abuts to the front face of the profile in a blunt manner.

The passage of the cable through the cover plate is performed through a respective cable bore, into which a cable grommet is threaded, or through a cable grommet, which is formed integrally with the end cover. Instead of a run-out cable, a connector unit can also be located directly in the cable grommet, which, in turn, seals with an O-ring relative to the interior circumference of the grommet, or which is also glued, so that a connection of the device via a connector unit becomes possible.

The cover plate and/or the profile are preferably comprised of electrically conductive material, in particular metal, in particular zinc. Due to the at least segment wise round outer circumference of the profile, or even a protective tube surrounding the profile, the mounting can be performed at the surroundings, either of the profile, or the tube through customary mounting means, like pipe clamps, supports, tension lugs, or similar, wherein the tension lugs have an eccentric bore for putting in the threading, in order to already be able to provide an engagement into the outer groove, through rotating the tension lug, when a loose bolted connection has been established.

Elements triggering the signal, which are moveable in longitudinal direction along the device, mostly a slide with a magnet, can either be guided at a surrounding component, and have no contact with the profile or the protective tube, surrounding the profile, or can be guided along the profile or protective tube in a form locking manner.

It is a possibility to have the slide engage into the respective outer grooves of the profile in a form locking manner, thus guiding it along the outer circumference.

The outer contour of the profile is preferably polygonal, in particular rectangular.

The outer surfaces of the profile are particularly flat, in particular multi segmented outer surfaces, wherein, as it is already known, only the outer areas of these outer surfaces form partial outer surfaces, which are parallel to each other, and wherein the remaining central part is recessed relative to it. When placed against an opposite planar surface, thus only the rim areas come in contact, so that in a non flat opposite surface a safe, defined contact is provided.

To each outer surface two offset, thus a pair of outer grooves, in particular identical outer grooves, is assigned, wherein these are particular corner grooves, located in the corner areas of the outer profile.

Additionally, in one of the outer surfaces, in particular exactly in its center, a center groove is located, so that the outer groove is symmetrical to the longitudinal center plane of the profile, extending through the middle groove.

The corner grooves and/or the middle grooves are preferably undercut, wherein the corner grooves have flanks, which extend in parallel to one of the outer surfaces.

Since the corner grooves are preferably provided, symmetrical to the bisecting line of the corner, in which it is disposed, each corner groove then has two such flanks, extending in parallel respectively to one of the adjacent outer surfaces, through which the corner grooves have a particularly triangular or trapezoid basic shape. Thereby, the free ending protrusions, formed by the flanks parallel to the outer surface, which receive the corner groove between them, are spaced apart so far, so that between the free end of such protrusion, measured in the extension of the protrusion, relative to the opposite protrusion of the same corner groove, an offset remains.

Similar to the corner grooves, preferably also the center grooves are provided symmetrical to its center plane, in this case the center plane of the entire profile. The center groove is preferably provided with two indentations pointing away from each other at an oblique angle, forming a floor in between, and thus forming an approximately roof shaped cross section of the center groove. The floor of the middle groove between the two deeper reaching indentations constitutes a part or the entirety of the depressed central area of the respective outer surface, in which the center groove is located.

Along the outer contour of the profile, a slide can be moved, which is held in an interlocking manner, by the outer contour of the profile in all directions transversal to the longitudinal direction.

Typically, the slide is then run along one of the outer surfaces, and for this purpose, engages in a form locking manner, either into the middle groove, or into the corner grooves disposed on both sides of the desired outer surface. In both cases, it is normally desired, that the respective outer surface, along which the slide is being moved, is mostly covered by the slide, in order to avoid contamination of this outer surface. For this purpose, the slide has an approximately roof shaped cross section, which covers the respective outer surface, and abuts to it at a surface, that is as large as possible, or has only a very small offset relative to it.

If the slide is guided in the middle groove, it engages into the indentations of the center groove with respective protrusions, but it has an offset from their center floor for reducing friction. In particular, the protrusions of the slide reaching into the indentations, have a rounded or round cross section, in order to minimize the contact surfaces between protrusions and indentations.

Through providing combination grooves in the outer contour of the cross section of the protective profile different objectives are achieved simultaneously.

Through being able to insert plate shaped elements into the combination grooves in transversal direction, the protective profile can be mounted at any location of its longitudinal extension through tension lugs, which engage into the combination grooves with their plate shaped sections, to a receiving component, possibly also with different spacing of the bolt pattern relative to the protective profile.

Since self cutting screws can be screwed into these combination grooves in longitudinal direction from the front face, the same combination grooves can be used e.g. for screwing down e.g. blunt end covers onto the face sides of the protective profile, whereby a very simple and cost efficient method for sealing the interior cavity of the protective profile, e.g. with a flat gasket placed in between, can be accomplished, in particular, when one of the end covers has a cable grommet for connecting the processing electronics in the interior of the protective profile. In particular in this case, no element protrudes beyond the outer contour of the protective profile in a lateral manner.

Interior contour of the insert:

The contour of the circumferentially enclosed insert is determined through at least one wave conductor cavity, and at least one pair of circuit board grooves, having to be present there, preferably two of each, in order to allow a redundant configuration of the distance measuring device, thus with two wave conductor units, and two respective associated circuit boards with processing electronics located thereon.

The wave conductor cavity is thus a groove with an internal circumference provided as a circular arc, in particular an undercut groove, whose interior diameter is selected, so that the typically cylindrical wave conductor unit can be inserted in longitudinal direction in a form locking manner, and cannot slide out in lateral direction.

The wave conductor cavity can be provided on the outside of the profile of the insert, whereby a cavity appropriate for the wave conductor is created after inserting the insert into the profile.

The wave conductor cavity can also be provided in the interior of the insert, and is then typically a circumferentially closed wave conductor cavity, or at least an open, but undercut wave conductor cavity, in order to hold the wave conductor unit in the lateral direction in a form locked manner.

Also, the printed circuit board grooves, provided in the inner contour of the insert, are provided open towards the interior.

The position fixation in longitudinal direction thus is performed through friction locking, at the circuit boards through one or two elastic strings, e.g. made from rubber or silicon, inserted along the longitudinal edges of the circuit board in the base of the groove, or a respective hose, which is released after longitudinal positioning at the desired location, wedging the circuit board between the circuit board grooves through the subsequent lateral expansion of the elastic hose or the elastic string.

The wave conductor unit on the other hand thus has a sufficiently large friction coefficient relative to the interior circumference of the wave conductor cavity, in order not to move freely anymore, after insertion in longitudinal direction, since it preferably also has a slippage inhibiting and elastic hose, e.g. made from silicon at its outer circumference, which can also be stretched for inserting the wave conductor unit.

The circuit board grooves are thus either configured, so that the circuit boards to be placed therein are either located parallel to each other, transversal to the longitudinal central plane, which is defined by the center of the profile, and the center of the at least one wave conductor cavity, or through the connection line between two wave conductor cavities.

The other possibility is to dispose the printed circuit board grooves, so that the respective circuit boards, inserted therein, are located parallel to the longitudinal center plane, of course laterally offset to the wave conductor cavities.

Preferably also the printed circuit board grooves are provided as undercut grooves, in particular as combination grooves.

Depending on the primary goal, the profile can have a wall thickness that is as constant as possible on all sides of the circumference, thus with a variation of the thickness of maximally +/−30%, in particular maximally +/−20%, or contrary to that, in spite of the necessary cavities in the interior, thus for housing the circuit board, and the components located thereon, and the wave conductor units, accumulate as much material as possible, so that the wall thickness measured in radial direction at the thickest location is at least 3 times, better 5 times, the thickness at the thinnest location.

Preferably the interior contour of the insert has two, in particular opposing, wave conductor cavities, and 2, better 3 pairs of circuit board grooves, in particular also for the disposition of circuit boards with different widths.

The interior contour is thus symmetrical, preferably to the longitudinal central plane, in particular and/or to the transversal center plane.

The interior contour of the insert, in particular of the tubular profile mentioned subsequently, is preferably depicted twice mirror symmetrical, thus symmetrical to the middle, on the one hand, relative to the longitudinal center plane of the outer contour, and, on the other hand, to a transversal plane, located at a right angle relative to it.

Additionally, the cross section of the conductor groove is substantially larger than the cross section of the circuit board grooves, since the smallest free cross section of the printed circuit board grooves corresponds to the thickness of the circuit board materials, in particular of the material of the circuit board holders, which will be described later. These grooves of the interior contour serve for inserting the components, which belong to the processing electronics of the distance measuring device. A wave conductor unit can be inserted in one or even both conductor grooves. Into the conductor grooves printed circuit boards, which carry components of the processing unit, or printed circuit board holder, to which this one or plural printed circuit boards of the processing electronics are mounted, can be inserted. In addition, these printed circuit board grooves can be used for bolting components, in particular covers, to the front face, due to their shape, through self tapping bolts being threadable into the open face ends of these grooves.

A sliding in longitudinal direction of such components in the circuit board grooves is prevented by slip inhibiting material, in particular by an O-ring inserted around the inserted printed circuit boards, or printed circuit board holders, which is received into the cross section of the printed circuit board grooves.

Thus it is possible, through the selection of the length of the tubular profile, slightly longer than the intended length of the wave conductor, to house the processing electronics, also completely within the circumferentially closed tubular profile.

The contour of the insert only has a single first main cavity for receiving the wave conductor in a first preferred embodiment, and a second main cavity for receiving the processing electronics, in particular provided as one or several circuit boards, wherein the first and the second main cavity are connected via a bottleneck, or completely separate from each other, which gives additional stability to the protective profile.

The outer contour of the profile is preferably at least three times as wide, as it is high, wherein the combination grooves are preferably arranged in pairs, only on the narrow sides, and thus with corresponding distances to the respective broad sides. In another embodiment, the combination grooves can also be located in the corner area between broad sides and narrow sides of the outer contour, so that plate shaped elements can then be inserted into the combination grooves parallel to the narrow side, and also in parallel to the broad side.

The combination grooves themselves have an internal contour, which is at least partially shaped as a semicircle, or has bulges, which reach towards the inside beyond a theoretical circular interior contour. The combination grooves particularly have an interior contour with a circular arc shape, which extends over more than 250°, whose open side expands to the outside shaped as a cone.

Combination grooves, which are disposed in the corner area of the outer contour, have a substantially triangular interior cavity, which is formed by protrusions, which are parallel to the adjacent side surfaces, which do not reach other completely, wherein two protrusions preferably reach upwards from the bottom surface of the approximately triangular interior cavity, in parallel to its center, which serve for cutting the threads of bolts threaded into the combination groove, without the entire cross section of the combination groove being deformed thereby.

BRIEF DESCRIPTION OF THE DRAWINGS

Embodiments of the invention are subsequently described in more detail.

FIG. 3 is a second embodiment of a distance measuring device in partial sectional view.

FIG. 4*a* is a cross section through an embodiment similar to FIG. 3.

FIGS. 4*d*-4*h* are the analog inserts according to the one of FIG. 3.

FIGS. 5*a* and *b* are different end cover designs.

DETAILED DESCRIPTION OF THE INVENTION

Figure 1:
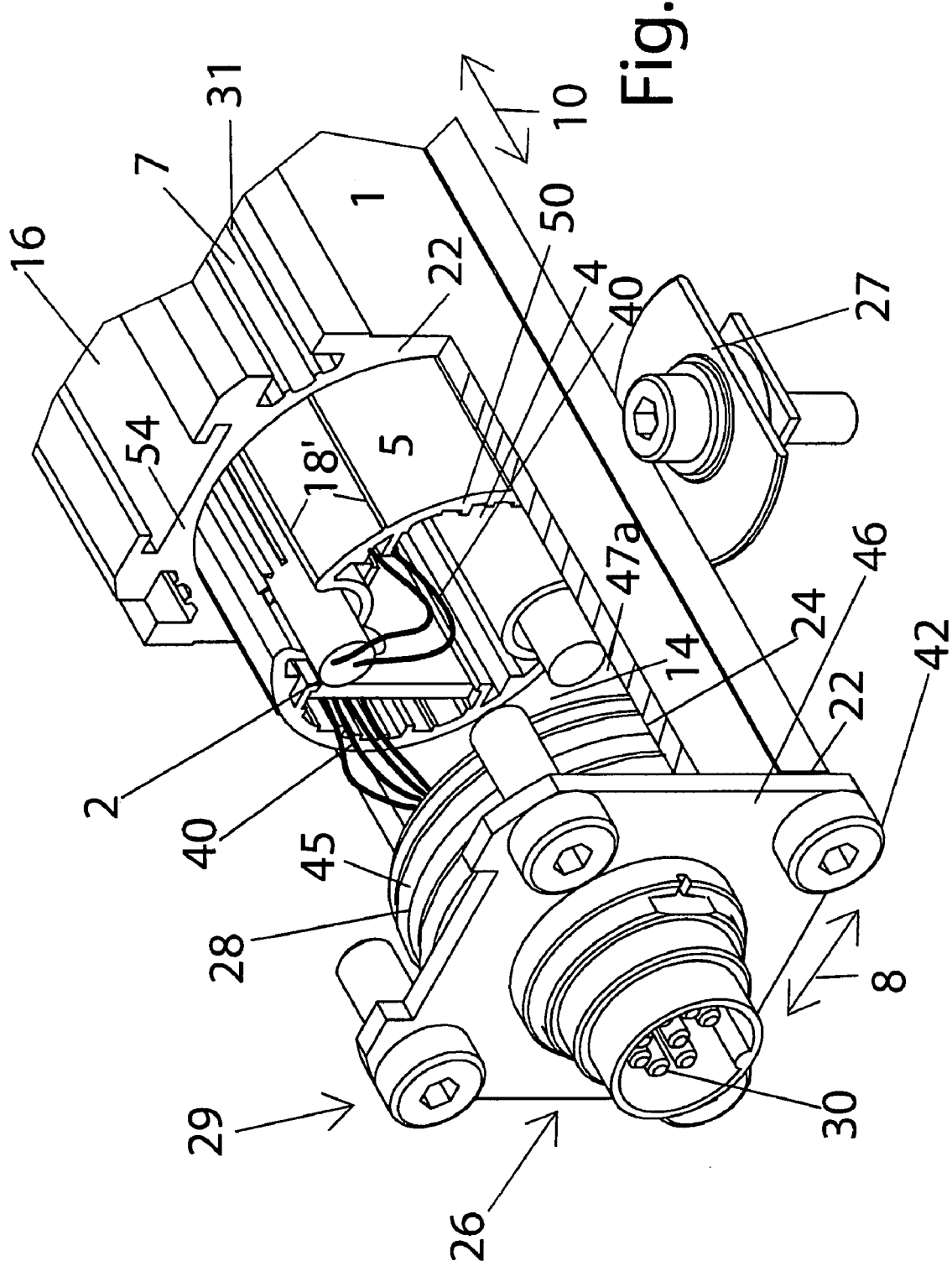
FIG. 1 is a first embodiment of the distance measuring device of the present invention in a partial sectional view.

In FIGS. 1 and 2, a plastic insert 50 is located in a corresponding shoulderless, in this case, circular inner contour 54, in a stable metal profile 1, which is cut to a desired length and closed with tightly sealing closing covers 29, only one of which is shown in FIG. 1. The other closing cover, not shown, does not have to have a cable grommet and no integrated connector component, but can only serve the tight closing of the rear end of profile 1.

The interior contour 54 of profile 1 is without a shoulder and, in this case, is also circular in order to be able to perform the sealing relative to closing covers 29 at the end sections.

This sealing is performed by closing cover 29 having a cover plate 46, on the one hand, which is placed onto a front face 22 of profile 1 in a blunt manner and which has pass-through holes in its corner area for passing through bolts 42, which are inserted into profile 1, thus, its outer grooves 6, in particular, its corner grooves 7 through which closing cover 29 is firmly pressed onto front face 22.

From cover plate 46, a protrusion 45 protrudes forward in a longitudinal direction 10 into an interior cavity 14 of profile 1 wherein an outer contour of the protrusion 45 is slightly smaller than the shoulderless inner contour 54 of profile 1.

Thereby, it is possible in an outer circumference of protrusion 45 to provide one or even several annular grooves 28 in axial direction behind each other and to insert a respective O-ring 24 therein which is sized so that it presses against interior contour 54 of profile 1 during insertion of protrusion 45, and thereby seals closing cover 29 relative to profile 1 in a reliable manner. Since this seal is located in the interior of profile 1, and not at the gaps between cover plate 46 and front face 22 of profile 1, which are visible from the outside, the sealing action is much stronger and easily resists the impact of a pressure washer, for example.

The plastic insert 50 is a circumferentially closed tubular profile with an outer contour 55 fitting into the inner contour 54 of profile 1 and can be safely positioned there, possibly through additional gluing in longitudinal direction, and with respect to its rotation position. The inner contour 4 of insert 50 is thus shaped accordingly, as described in the following, in order to receive the functional components as e.g. the wave conductor 2 and one or several circuit boards 23, which carry the processing electronics 12.

The insert 50 is thereby sized shorter than the profile 1, and positioned in its center longitudinal area of the profile 1, so that end cavities 47a, b are created in the end sections of the profile 1, into which the insert 50 does not protrude, and which are thus available for insertion of the protrusion 45 of the closing cover 29. The end cavities 47a, b can thus be required in different sizes, due to different designs of the two end covers, in particular with or without pass-through of cables from the interior cavity 14 of the profile 1.

The outer contour 55 of the insert 50 is shown in FIGS. 1 and 2 accordingly, substantially also circular with respective small linear bulges 18', extending in longitudinal direction, which constitute an oversize relative to the interior circumference of the profile 1, and which facilitate the safe friction locked reception in the interior profile. The insert 50 has two wave conductor cavities 20, and additionally the interior contour 4 of the insert 56 has a plurality of circuit board grooves 19.

The wave conductor cavities 20 are used for inserting the stick shaped or hose shaped wave conductor unit 2, whose outer circumference is typically circular, which is to extend substantially over the entire length of the insert 50, and in whose interior the wave conductor 3 is located. Accordingly, the wave conductor cavity 20 is a circumferentially closed cavity 20 with a corresponding, also circular inner cross section (FIG. 2c), or a respectively formed and sized, open, e.g., undercut groove 20', as shown in FIG. 2b, as open to the outside in the outer contour 5. The fixation in longitudinal direction is performed through the sufficiently high friction of the wave conductor unit 2, relative to the insert 50, and also relative to the profile 1.

Thus, both wave conductor cavities 20 and 20' preferably oppose each other.

Thus, the insert 50 is positioned in the profile 1, so that the wave conductor cavities 20, in which a wave conductor unit 2 is actually located (with grooves 20', open to the outside, preferably in both), directly under the center groove 16, which is formed in the outer contour of the profile 1, the other wave conductor cavity 20' serves the insertion of another wave conductor unit 2, in case of a redundant design of the distance measuring device.

Between the wave conductor cavities 20 or 20', a plurality of circuit board grooves 19 is formed in the inner contour 4, which are sized and positioned to receive the longitudinal edges of the circuit boards 23, on whose middle section the processing electronics 12 are formed, in a form locking manner.

The circuit boards 23 are inserted, certainly before attaching the closing covers 29, between two opposing circuit board grooves, and fixated in longitudinal direction. Several such pairs of circuit board grooves 19 are distributed over the circumference of the insert 50, which allow for the insertion of circuit boards 23 with different widths at different locations of the cross section of the insert 50, and selectively also in an orientation parallel to the connection plane between the two wave conductor cavities 20, and also transversal to it.

Figure 2A:
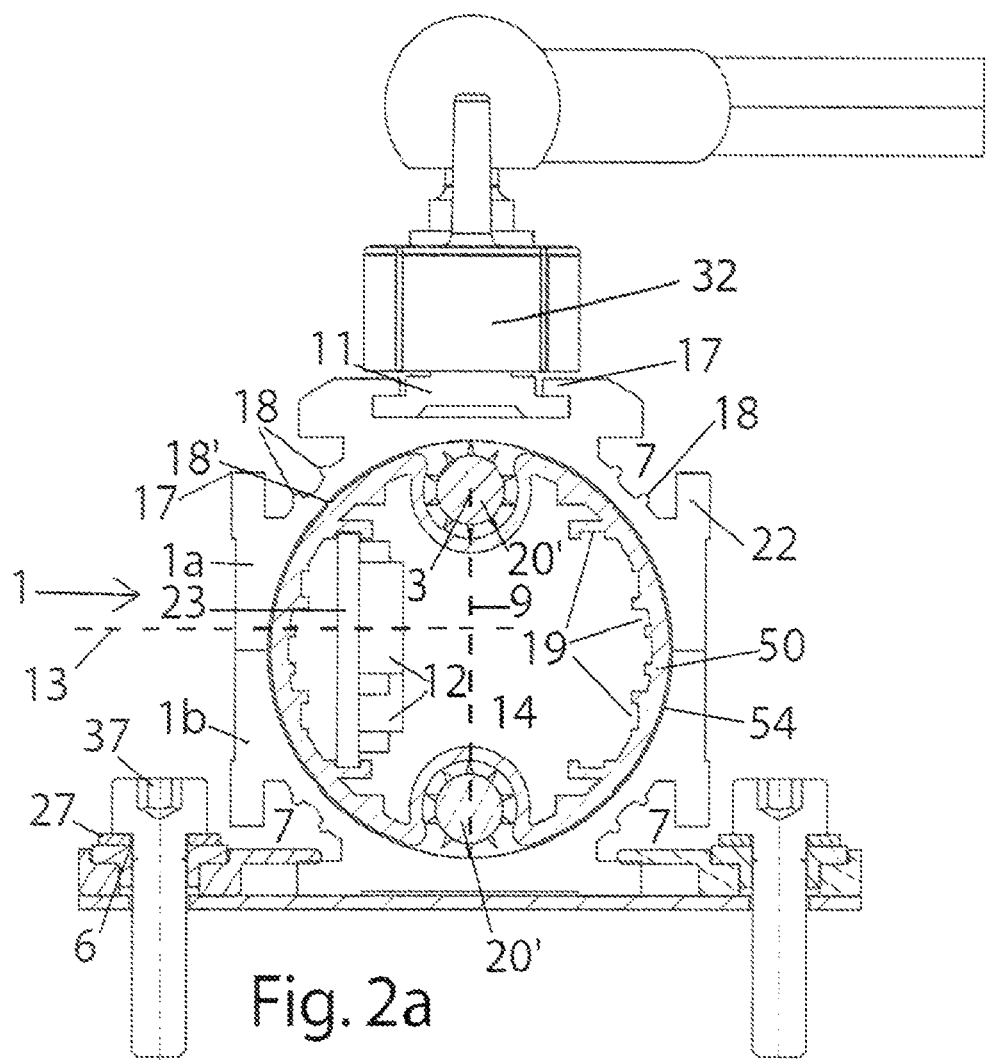
FIG. 2*a* shows a cross section through the device similar to FIG. 1.
Figure 2B:
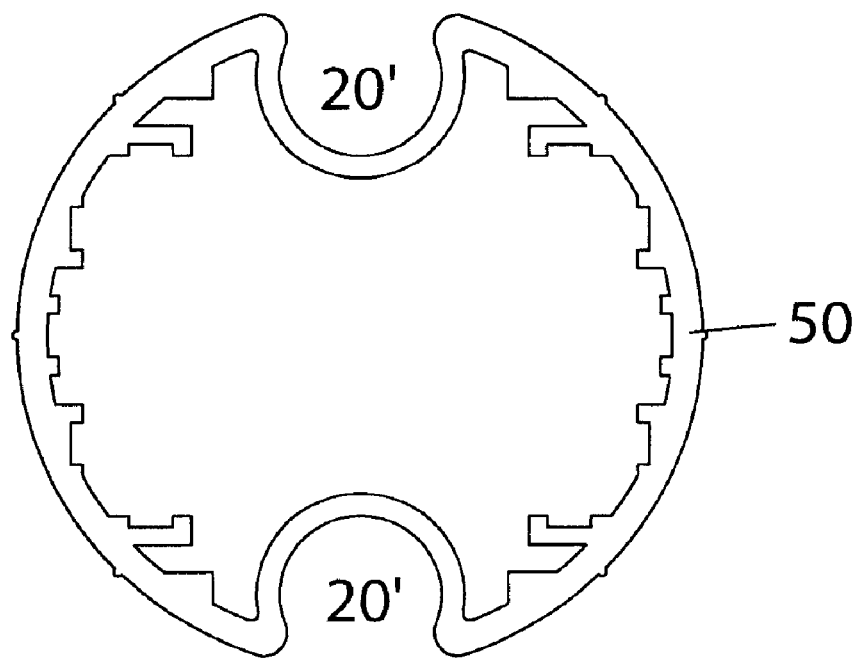
FIG. 2*b* shows a cross section through the insert according to FIG. 2*a*.
Figure 2C:
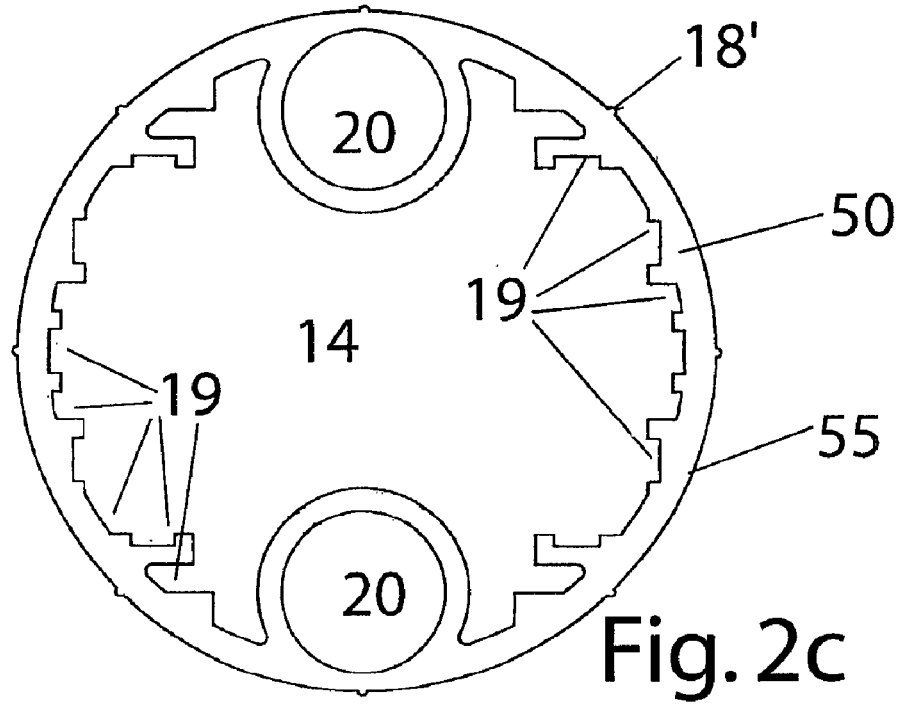
FIG. 2*c* shows a circular cross section through the insert.

While only one such circuit board 23 is shown in FIG. 2a, also several circuit boards can be disposed at the same longitudinal position, either in longitudinal direction behind each other, or distributed over the cross section.

Via the electrical conductors 40, a connection of the wave conductor 3 disposed in the wave conductor unit 2, as well as the reverse conductor, is performed via a respective conductor with the circuit board 23, from where conductors 40 lead towards the outside, in case of FIG. 1, to a connector 30 centrally installed in the closing cover 29, which is located tight in the connector passage 26 of the cover plate 46.

The outer contour of the profile 1 is approximately square, corresponding to the circular inner contour, with outer surfaces disposed at a right angle relative to each other, which have a shallow concave fillet in their center area, and thereby only abut or contact at a flat surface of the environment only with their rim areas. These side surfaces are provided as protrusions 17, protruding over the area provided as corner grooves 7, whereby an undercut corner groove with an approximately triangular or trapezoid cross section is created. Through two bulges from the floor of the corner grooves 7, each offset with respect to its center, these corner grooves 7 serve a double function.

On the one hand, they are used to threading in self threading bolts, which are used for bolting down the closing cover 29 in longitudinal direction, wherein the threads, among other places, cut into the bumps 18, but also into the inner corners of the flanks 17.

Thereby, the detachability of the closing covers 29 is assured, so that also during repairs at the distance measuring device, it can then subsequently be sealed tight again without having to exchange the profile.

As shown in FIG. 2a, the corner grooves 7 are also being used for inserting plate shaped elements, radially from the side, e.g. tension lugs 27, which have a pass-through bore, and which can be bolted onto the base through the bolt pattern 37, and possibly with a respective spacer under the plate shaped tension lug 27, corresponding to the thickness of the flank 17, and can, thereby hold the profile 1 safely on this base.

On one of the flat outer sides, the flat middle groove is provided deeper and more undercut, therefore, the wall thickness of the profile 1 has to be larger in this area, and facilitates the form locking guidance of a slide 11 in longitudinal direction, in which the magnet 32 is housed, which constitutes the positioning element for the measurement device, and influences the wave conductor unit 2.

The FIGS. 3 and 4 show an embodiment with another cross section, thus a flat rectangular profile 1' with a respectively flat insert 50' from plastic, and a respectively flat rectangular closing cover 29'.

Otherwise, the goal, the assembly and the interior design are analogous. The comprised differences are the following:

In FIG. 3, no connector is located at the one closing cover 29', but a cable grommet 25, through which the cable 48 can be run out of the interior cavity 14 in a tight manner.

The profile 1' does not have a center groove, so that the position indicating magnet has to be guided contactless, possibly guided by another component, preferably at a distance along the outside of the profile 1 in longitudinal direction 10.

Also here, the profile 1' in FIG. 3 is closed on its circumference and provided in one piece.

The profile 1' has outer grooves, not shaped as corner grooves, but disposed in pairs, respectively in the narrow sides of the profile 1', which is preferably placed and mounted in the insert and onto the base with a broad side.

The grooves are provided as combination grooves 51, and have an undercut, in particular vase shaped cross section with an also rectangular indentation in the base of the groove.

Thereby, they fulfill the same double function as the corner grooves of the solution, according to FIGS. 1 and 2.

A marker 44, shaped as a longitudinal groove is machined into both broad sides of the outer surface of the respective location of the profile 1', where the wave conductor unit 2 shall be located, when the distance measuring device is completely assembled, which is shown with a hose in the solution of FIGS. 3 and 4, whose outer contour is serrated, so that the outward protruding elastic bumps of the wave conductor unit press into the interior circumference of the wave conductor cavity generating high static friction.

Figure 4B:
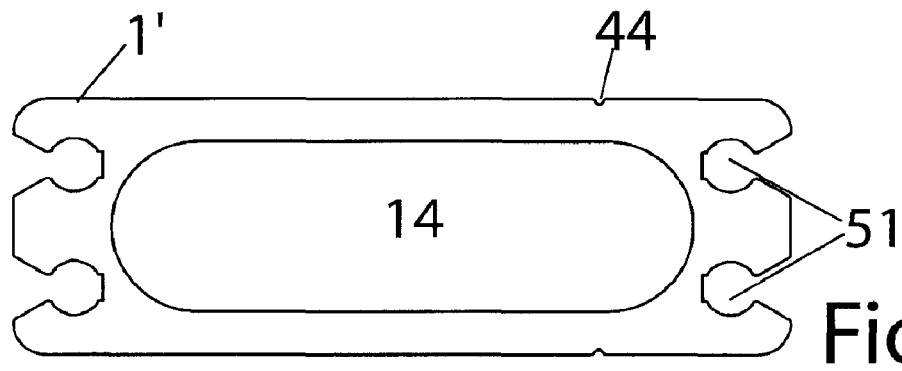
FIG. 4*b* is the profile according to FIG. 3.
Figure 4C:
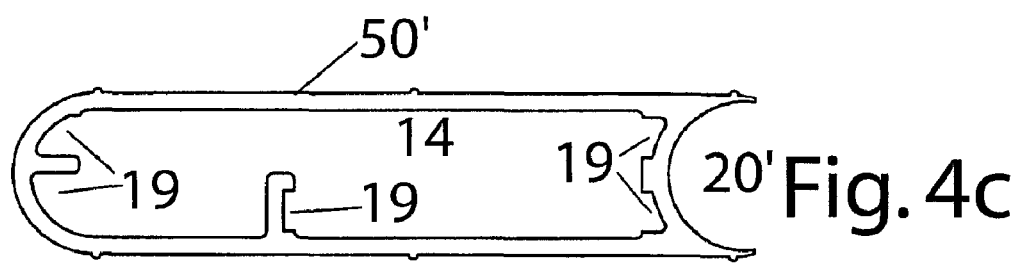
FIG. 4*c* is the insert according to FIG. 3.

A substantial difference of the insert 50', shown in FIG. 4c by itself is that the wave conductor cavity is not a component of the interior cavity 14 of the insert 50', but formed on its outside.

Correspondingly, the outer contour 55' of the insert 50 is not adapted to the inner contour 56' over the entire circumference of the profile 1', which has an inner contour formed as an elongated hole in this solution.

Instead, the outer contour is provided as a hollow fillet in one of the narrow sides of the insert 50, so that a circular wave conductor cavity 20 is generated in the profile 1' after inserting the insert 50', between this concave fillet and the associated narrow side of the long hole shaped inner contour 54 of the profile 1'.

Thus, due to the circumferentially closed profile of the insert 50', the wave conductor cavity 20 is separated in lateral direction from the interior cavity of the insert 50', in which the circuit board 23 is disposed in assembled state, again through insertion between two circuit board grooves 19 provided as pairs. The circuit boards 23 are preferably provided here only in a plane parallel to the broad side of the insert 50', but also there at least two pairs of circuit board grooves 19 are provided for inserting two circuit boards with different widths.

The disposition of the wave conductor cavity 20 outside of the interior cavity of the insert 50 is possible in any embodiment, thus also with the embodiment of FIGS. 1 and 2.

Figure 4D:
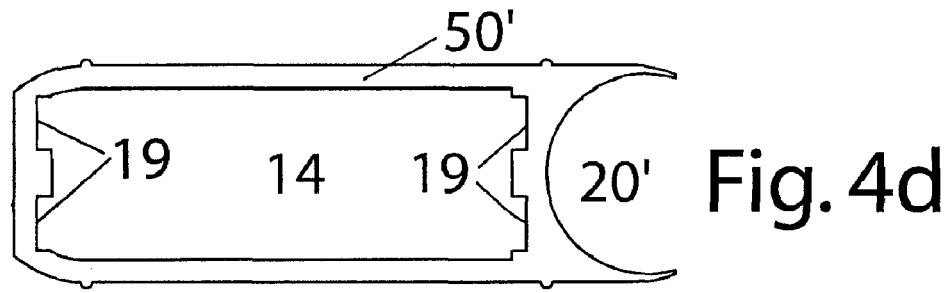

The insert 50', according to FIG. 4d, differs from the one of FIG. 4c only in minor details.

While in the insert 50' according to FIG. 4c, the narrow side, in which no wave conductor cavity 20 is provided is semi round, thus according to the inner contour of the receiving profile 1' at this location, the insert 50' of FIG. 4d is flattened at this location in order to compensate here for manufacturing tolerances.

Also the inner cavity 14 has another design, whereby the circuit board grooves 19 are only located in the narrow sides of the interior cavity 14, and in particular, the entire insert 50' is symmetrical to its longitudinal center plane.

Figure 4E:
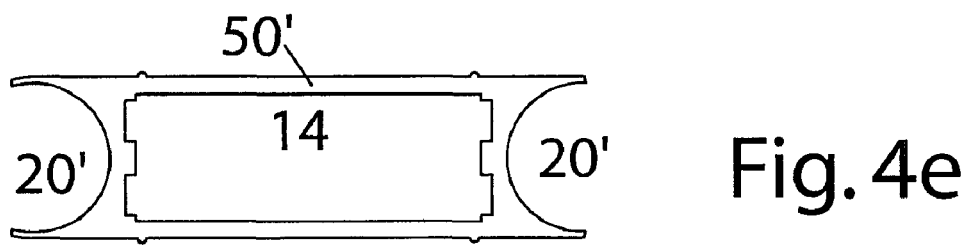

The embodiment of the insert 50' according to FIG. 4e is additionally provided also symmetrical to the lateral center plane. A wave conductor cavity 20', provided as a groove open to the outside, is formed in both narrow sides of the insert 50'.

Figure 4F:
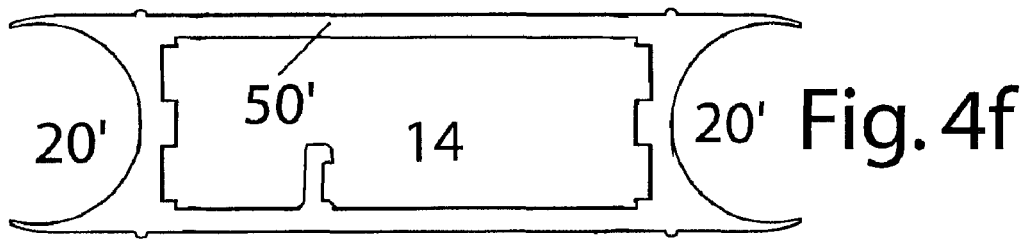

Independent from that, the interior cavity 14 can thereby be provided nonsymmetrical, and have a design according to FIG. 4c in particular, which is realized in the example of the insert of FIG. 4f.

The FIGS. 4g and 4h show the profile 50' according to FIG. 4e, readily assembled in a respective flat profile 1' in cross section (FIG. 4g), or in a partial sectional perspective view (FIG. 4h), thus according to the FIGS. 3 and 4a.

In the FIGS. 5a and 5b, closing covers 29' according to the closing cover of FIG. 3 are shown, however, with different kinds of pass-throughs for an electric conductor.

While a typical cable grommet 25 was provided in FIG. 3 for tight pass-through of a cable 48, the end cover 29' of FIG. 5a has a cable grommet 25', made from metal in one piece, together with the closing cover 29', thus its cover plate 46, which has an interior thread 25a, which can be used for form locking, fixed threading of a cable 48, wherein the teeth of the interior thread 25a carve into the outer circumference of the insulation of the cable 48.

The closing cover 29', according to FIG. 5b, on the other hand, shows an integral one piece connector passage 26 with an outer thread 26a on the outside for a tight screw connection of an appropriate connector.

Irrespective of this design detail, each closing cover 29 of this design has a protrusion 45, reaching from the cover plate 46 into the interior of the profile, whose outer circumference fits into the inner contour of the profile 1 or 1'.

In the outer circumference of the protrusion 45, an annular groove 28, or even several of them axially behind each other are provided, for inserting an O-ring 24, then protruding beyond the annular groove 28 towards the outside, which constitutes the seal relative to the interior circumference of the profile 1.

Figure 6A:
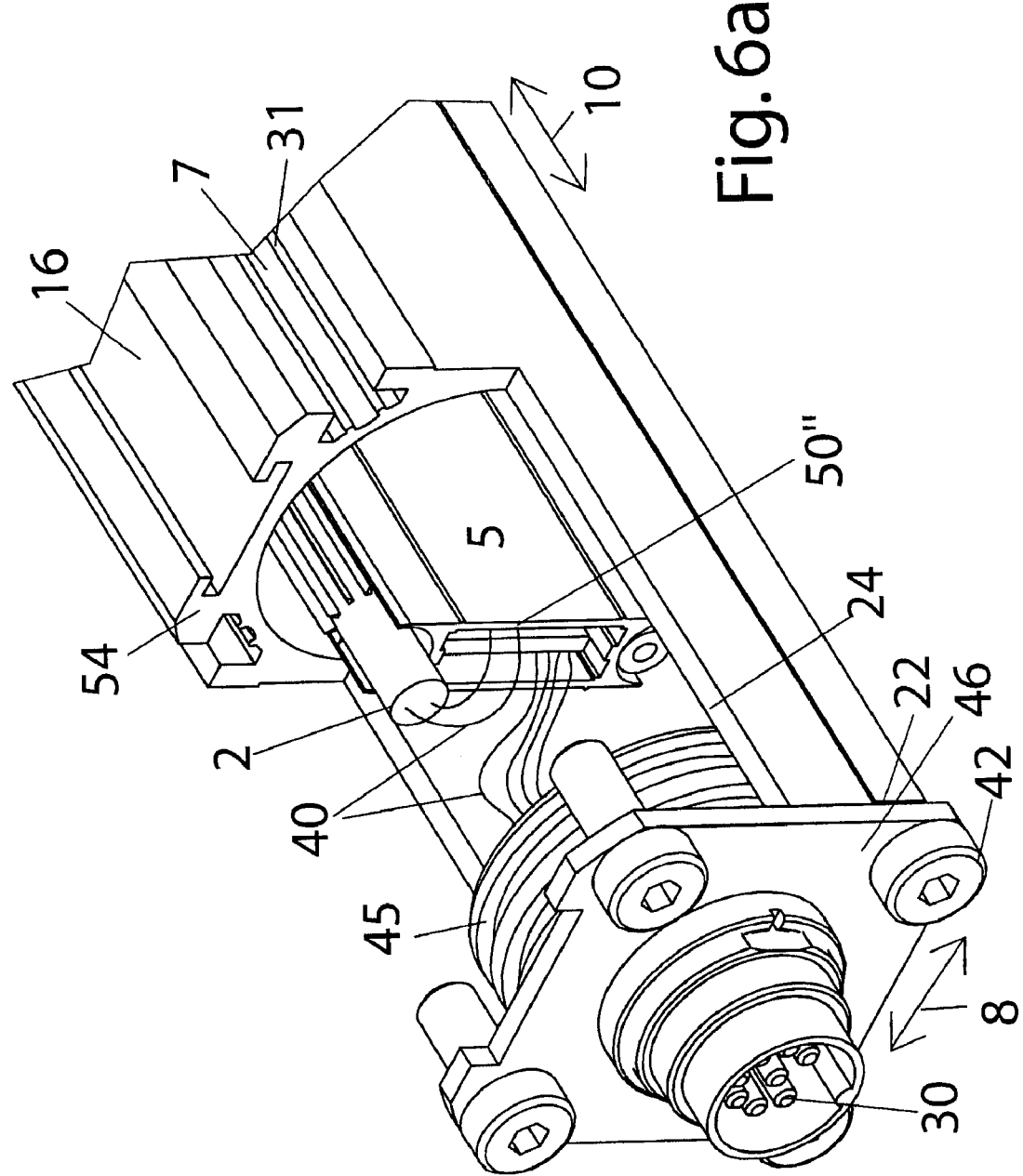
FIGS. 6*a* and *b* show the use of a universal insert.
Figure 6B:
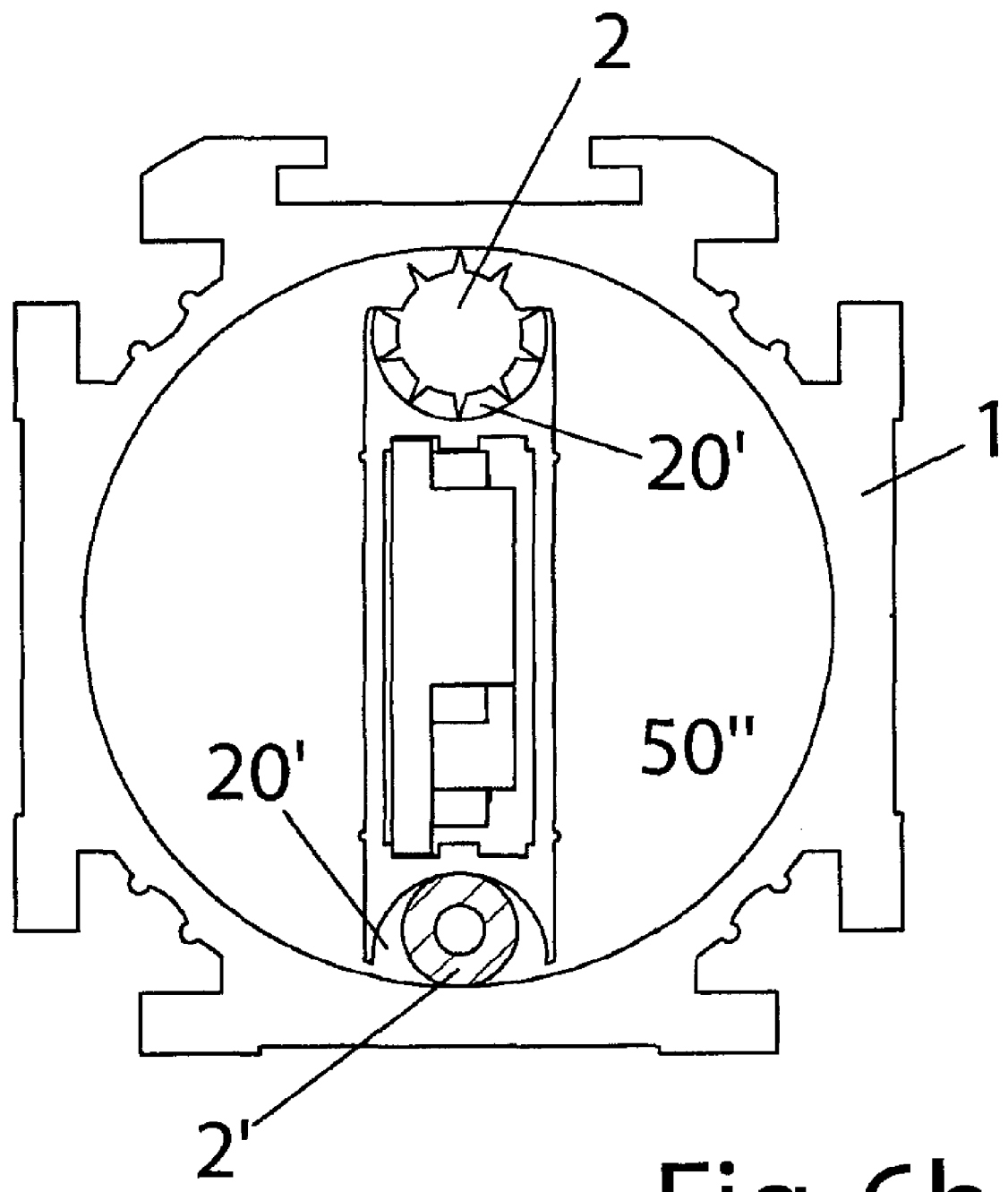

The FIGS. 6a and 6b additionally show the use of the insert 50' of FIG. 4e as a universal profile, through the same insert 50" being inserted in a profile 1 with an outer circumference that is approximately rectangular, analogous to the FIGS. 1 and 2.

The views of the FIGS. 6a and 6b correspond to those of the FIGS. 1 and 2a.

This is possible, since the insert 50" provided with wave conductor units 2 or a respective non functioning dummy 2' of a wave conductor unit has a maximum diameter, which does not only fit into the largest interior diameter of the flat profile 1', but also into the circular interior diameter of the profile 1, and which is supported in both of them in lateral direction via the elastic wave conductor unit 2, on the one hand, and the dummy 2' inserted into the other wave conductor cavity of a wave conductor unit, or an analog element, elastic transversal direction, extending in longitudinal direction, e.g. an elastic hose, in which at least one of the two protrudes radially to the outside from the respective wave conductor cavity 20, and which supports itself in the inner contour 54 of the profile 1.

REFERENCE NUMERALS 1, 1' Profile
2 Wave conductor unit
3 Wave conductor
4 Inner contour (of 50)
5 Outer contour (of 50)
6 Corner grooves (combination grooves)
8 Lateral direction
9 Longitudinal center plane
10 Longitudinal direction
11 Slide
12 Processing electronics
13 Lateral center plane
15 String
16 Center groove
17 Flank
18, 18' Bulge
19 Circuit board groove
20 Wave conductor cavity
21 Enveloping circle 22 Front face
23 Circuit board
24 O-ring
25,25' Cable grommet
25a Interior thread
26 Connector passage
26a Outer thread
27 Tension lugs
28 Annular groove
29,29' Closing cover
30 Connector
31 Tube clamp
32 Magnet
33 Support
34 First main cavity
35 Second main cavity
37 Screwed connection (of the tension lugs)
38 Serrated hose
40 Conductor
42 Bolt
43 Clamping elements
44 Marking
45 Protrusion (of 29)
46 Cover plate
47a,b End cavity
48 Cable
50,50' Plastic insert
51 Combination groove
52 Protrusion
53 Bridge
54 Inner contour (profile 1)
55,55' Outer contour of the closing cover 29

What is claimed is:

1. A distance measuring device, said device comprising:
a housing shaped as a stable, hollow, circumferentially closed profile (1), sealable on its front face, with a constant cross section contour in longitudinal direction (10);
a wave conductor unit (2) in an interior of the profile (1), wherein a wave conductor (3) extends in the wave conductor unit (2) in longitudinal direction (10) of the profile (1);
processing electronics (12);
a magnet (32) as a position indicator movable in longitudinal direction (10) on the outside of the profile (1),
wherein the profile (1) has an interior contour (54) without a shoulder over the entire length; and in the interior contour (54) at least one insert (50, 50', 50") with an inner contour (4) is disposed torque proof, and the profile also has optional inner corners, outer corners and/or shoulders.

2. The distance measuring device according to claim 1 wherein said at least one insert (50) is made of plastic or metal.

3. The distance measuring device according to claim 1 wherein said at least one insert (50) has a flexible cross section, which has a flexible cross section with respect to its outer contour.

4. The distance measuring device according to claim 1 said at least one insert (50) has an outer contour which is provided over a circumferential area of at least 180° so that it fits into the inner contour of the outer profile (1) in a form locked manner so it can be inserted.

5. The distance measuring device according to claim 1 wherein said at least one insert (50) has a circumferentially closed hollow interior profile which is elastic in circumferential direction and is made of one piece.

6. The distance measuring device according to claim 1 wherein several identical inserts (50) are provided in said outer profile (1) offset in longitudinal direction (10) and are connected with said wave conductor unit (2) in a longitudinally fixed manner.

7. The distance measuring device according to claim 6 wherein said outer contour (3) of the cross section is provided symmetrical in the center to both transversal directions (20, 30).

8. The distance measuring device according to claim 1 wherein said inner contour of said at least one insert (50) includes as least one wave conductor cavity (20) and at least a pair of circuit board grooves (19).

9. The distance measuring device according to claim 8 wherein all said printed circuit board grooves (19) and also all said wave conductor cavities (20) are open toward a common inner space (14) which is enclosed by said profile (1, 1').

10. The distance measuring device according to claim 1 wherein said at least one insert (50) is not stable in lateral direction and is an elastomer filling the inner contour of said outer profile (1), shaped as a hollow hose.

11. The distance measuring device according to claim 1 wherein said profile (1) is closed on its face sides through a respective closing cover (29, 29'), which is mounted solid to said profile (1), without any damage to said profile (1) and closing cover (29, 29').

12. The distance measuring device according to claim 11 wherein said closing cover (29) has a protrusion (45) fitting into said interior contour (54) in a form locking manner through which a cover plate (46) radially protrudes at one end of the protrusion (45) for abutment against the front face of said profile.

13. The distance measuring device according to claim 12 wherein in an outer circumference to said protrusion (45) at least one annular groove (28) is provided for receiving an O-ring (24).

14. The distance measuring device according to claim 11 wherein said cover plate (46) does not protrude beyond an outer contour of said profile (1) except for its combination grooves (7) in the outer contour (5).

15. The distance measuring device according to claim 11 wherein said closing cover (29) is bolted in longitudinal direction (10) to said profile (1) in combination grooves (7) in corner areas of an outer contour of said profile.

16. The distance measuring device according to claim 11 wherein at least one of said closing covers (29) has an integrally formed cable grommet (25) with an interior thread in the cable pass-through.

17. The distance measuring device according to claim 11 wherein said closing cover (29, 29') and/or said profile (1) are made from electrically conductive material.

18. The distance measuring device according to claim 11 wherein a connector component (30) is disposed in a connector pass-through (26) which is sealed relative to the interior circumference of the connector pass-through (26) through an O-ring (24) or the connector pass-through (26) is sealed on the interior with sealing material, enclosing the electrical conductors (40).

19. The distance measuring device according to claim 1 wherein said inner contour (54) has a contour selected from any one of the group including partial circular sections, an elongated hole contour, an oval contour, and a circular contour.

20. The distance measuring device according to claim 1 wherein said at least one insert (50) is wedged and/or glued in said inner contour (54) of said profile (1).

21. The distance measuring device according to claim 1 wherein said profile (1) is designed to be positioned in a defined manner in a circular inner contour (4), surrounding the profile (1) over more than 180° of the circumference of an outer contour of said profile (1) in lateral direction (8) in a form locked manner and it is still rotatable around the longitudinal axis (10) in this inner contour (4).

22. The distance measuring device according to claim 21 wherein the distance measuring device is a magnetostrictive measuring device and the wave conductor (3) is made of magnetostrictive material.

23. The distance measuring device according to claim 1 wherein outer grooves (6) are disposed over the circumference an outer contour of said profile (1).

24. The distance measuring device according to claim 23 wherein said outer grooves (6) are provided as combination grooves (7) for threading in bolts (42) in longitudinal direction (10) of the grooves (6), as well as inserting plate-shaped elements in lateral direction (8).

25. The distance measuring device according to claim 24 wherein said combination grooves (7) are provided vase shaped with a cross section (7a) provided as circular segment in a lower area and a neck (7c) expanding toward an outside from its opening in a V-shape.

26. The distance measuring device according to claim 1 wherein an outer contour (5) of said profile (1) is provided symmetrical to a lateral center plane (9) also to a perpendicular lateral center plane (13), and four combination grooves (7) are disposed along a circumference of said profile (1).

27. The distance measuring device according to claim 1 wherein an outer contour of said profile (1) assigned to each outer surface includes at least a pair of outer grooves.

28. The distance measuring device according to claim 27 wherein outer surfaces of the profile extended perpendicular to each other and/or
the outer surfaces are defined through at least two parallel, offset contact lines and in particular
the outer surfaces have contact lines, each having at least two parallel partial outer surfaces (4a, b), and the remaining part of the outer surfaces is recessed relative to it and/or in particular
the outer contour of the profile is a tubular base-shape having outer grooves in the corner areas.

29. The distance measuring device according to claim 27 wherein in at least one of the outer surfaces is disposed a center groove, and outer grooves and the center grooves are undercut grooves;
the corner grooves have flanks extending in parallel to one of the outer surfaces; and the corner grooves have a triangular or circular segment-shaped base shape.

30. The distance measuring device according to claim 29 wherein said corner grooves (7) have a trapezoid base shape and the opposite corner is recessed in the direction of the extension of the cross section of groove from the flank (17) parallel to an outer surface, or
the outer contour of the profile is provided symmetrical to the longitudinal center plane (9),
the center groove is provided symmetrical and disposed on the longitudinal center plane (9); and the center groove (16) constitutes the recessed middle are of the outer surface.

31. The distance measuring device according to claim 30 wherein a slide (11) with its protrusions (17a, b) of the center section (17) is guided in indentations (7a, b) of a middle groove (14) and does not abut to a floor (14c) of the middle groove, and/or the transition between the lower contact surfaces of the roof (18) and the mid-section (17) is rounded as much as possible, and/or the free ends of the mid-section (17) have a round outer contour.

32. The distance measuring device according to claim 1 wherein an outer contour of a cross section of said profile (1) is at least twice as wide as it is high and has one respective combination grooves (51) only in the narrow sides, spaced from respective adjacent broad sides.

33. The distance measuring device according to claim 32 wherein said insert (50) is made of only one first main cavity for the wave conductor (3) of a position sensor and only one second, main cavity (35) for said processing electronics (12) which are either connected via a bottleneck (9) of an inner contour so that the protective profile (1, 1') only has a single cavity (35), or they are not connected with each other by the main cavity (35) being provided in the interior of said insert (50) and main cavity (35) being provided on an outside of a circumferentially closed insert (50).

34. The distance measuring device according to claim 32 wherein a marking (44) is provided along said broad sides at an outer circumference of the profile (1').

35. The distance measuring device according to claim 32 wherein said combination grooves (51) are located in a corner area between the broad and narrow sides of the cross section profile and are provided as corner grooves.

36. The distance measuring device according to claim 32 wherein two bulges (18) protrudes from the base surface of the interior of the groove for engagement of a bolt thread.

37. The distance measuring device according to claim 1 wherein the contour of said at least one insert (50) includes two identical wave conductor cavities opposing each other on a longitudinal middle plane and at least two pairs of circuit board grooves disposed in an area between said wave conductor cavities (20) so that an inserted circuit board can be located laterally extending and/or extending in parallel to a connection line between said two wave conductor cavities (20), thus the longitudinal center plane (9).

38. The distance measuring device according to claim 1 wherein at least three pairs of circuit board grooves (19) are disposed in said inner contour (54) and thus at least two pairs of circuit board grooves (19) include a different distance of the grooves of a pair among each other for circuit boards (23a, b) with different widths.

39. The distance measuring device according to claim 1 wherein said profile (1) has a constant wall thickness with a variation of +/−30%.

40. The distance measuring device according to claim 1 wherein at least a part of said processing electronics (12) is located on at least one circuit board (23) inserted in said circuit board grooves (19).

41. The distance measuring device according to claim 1 wherein said inner contour (4) of said at least one insert (50') is provided symmetrical at least to a longitudinal center plane (9) and to a lateral center plane (13).

42. The distance measuring device according to claim 1 wherein a circuit board (23) is held in a pair of circuit board grooves (19) through a string (15), elastic in lateral direction, disposed under preload in lateral direction (8) between a narrow side of the circuit board (23) and a respective circuit board groove (19), which is expandable in longitudinal direction.

43. The distance measuring device according to claim 42 wherein the position fixation in lateral direction (8) is through form locking and in longitudinal direction (10) through friction locking.

44. The distance measuring device according to claim 1 wherein said wave conductor unit (2) and at least one circuit board (23) with said processing electronics (12) are positioned separately in said interior contour (54) of said profile and fixed in position and connected only in an electrically conductive manner amongst each other.

45. The distance measuring device according to claim 1 wherein a position fixation of said insert (50, 50', 50") in said profile 1 in longitudinal direction (10), as well as in rotational direction around a longitudinal direction (10), is performed through friction locking through spreading effect of an object wedged over at least part of a length of said insert (50) in its interior contour (54) which has elastic sections in lateral direction.

46. The distance measuring device according to claim 1 wherein in said outer contour of said insert (50) two wave conductor cavities (20') are provided opposite to each other as grooves open to the outside, and said wave conductor unit (2) is made of elastic material with spring action in radial direction at least on its outer circumference.

47. The distance measuring device according to claim 1 wherein said device is mounted at a carrier component through tension lugs (27) engaging into outer grooves (6).

48. The distance measuring device according to claim 47 wherein a bore hole (36) in said tension lugs (27) is disposed eccentrically for receiving bolting (37) relative to a base.

49. The distance measuring device according to claim 47 wherein between said tension lugs (27) and an adjacent component an insulation element is disposed, and between said tension lugs (27) and a bolt penetrating it an insulation sleeve is disposed.

50. A process for producing a distance measuring device as set forth in claim 1, said process comprising the following steps:
   sizing a tubular profile (1) to a desired length, slightly longer than an effective measuring length;
   sizing said at least one insert (50) to a length shorter than the length of the tubular profile (1):
   inserting, portioning and mounting the insert (50) into the profile (1) so that in the frontal end areas, end cavities (47a, b) of a defined length are created into which the insert (50) docs not extend;
   manufacturing at least one said wave conductor (3) of a required length, slightly longer than the effective measuring length, and completing an at least one said wave conductor unit (2) with this wave conductor (3);
   inserting the at least one wave conductor unit (2) in said longitudinal direction (10) into the wave conductor cavity (20) of the profile (1), inserting at least one circuit board (23) with processing electronics (12) into a pair of circuit board grooves (19) into the interior cavity (14) of the profile (1);
   electrically conductively connecting the wave conductor unit (2) with the circuit board (23);
   running conductors (40) out, which lead away from the circuit board (23) through a closing cover (29') with a connector passage (26); and
   mounting closing covers (29, 29') with a seal and mounting to the front face of the profile (I).

51. The process according to claim 50 further including the steps of inserting the circuit board (23) with its narrow sides into a pair of circuit board grooves (19) while placing an elastic string (15) therebetween, expanded in longitudinal direction (10), extending in longitudinal direction (10), inserting and releasing the string (15), which was held under tension, after the desired axial positioning of the circuit board (23) and cutting the outward protruding superfluous end of the string (15) off.

52. The process according to claim 50 wherein after the cutting of the profile (I) to size and before inserting the other components, a cleaning of the interior cavity (14) is performed with through blowing out with compressed air, with a plug inserted on one side of the profile in a tight manner and permeated by the channel for the compressed air.

53. The process according to claim 50 wherein inserting the completed distance measuring device in longitudinal direction into a protective tube (35) is performed with an interior diameter slightly larger than the exterior diameter of the profile (1), after previous insertion of spacers (39) into the outer grooves (6) of the profile (I), with axial protrusion to the outside, axially spaced from each other in series.

* * * * *